R. W. L. DONLAN.
VEHICLE SPRING DEVICE.
APPLICATION FILED MAR. 7, 1912.
1,072,586.
Patented Sept. 9, 1913.
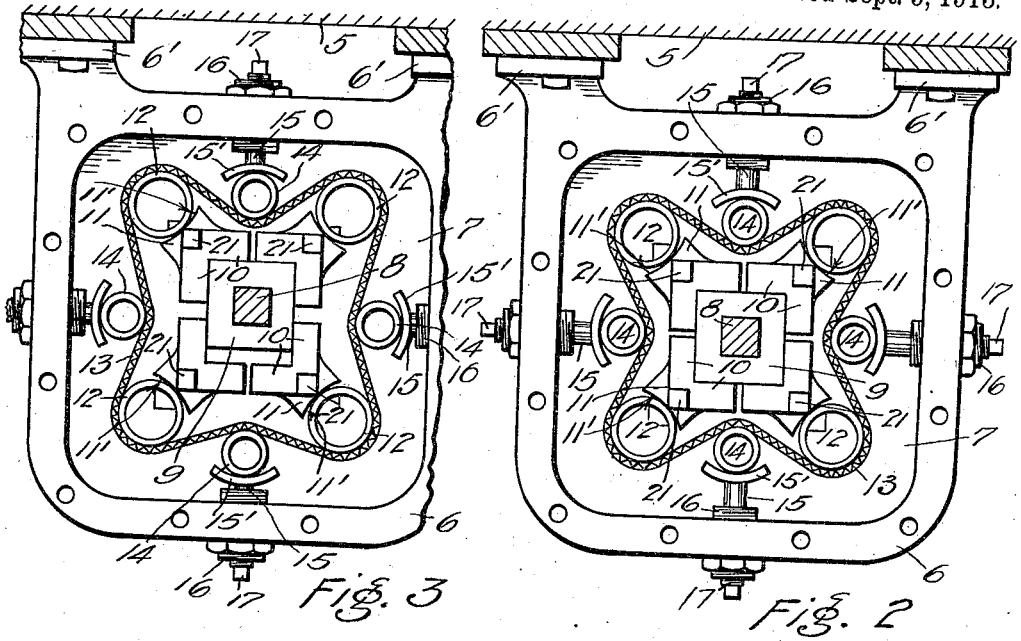
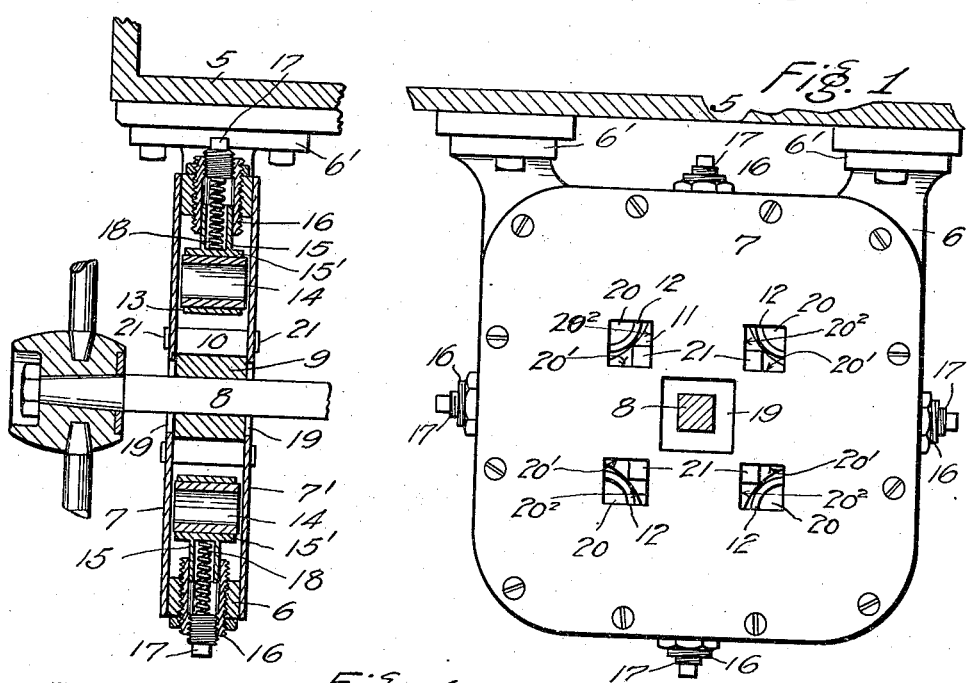
WITNESSES:
F. C. Matheny
E. Peterson
INVENTOR:
Robert W. L. Donlan
BY
Pierre Barnes
ATTORNEY

UNITED STATES PATENT OFFICE.

ROBERT W. L. DONLAN, OF SEATTLE, WASHINGTON.

VEHICLE SPRING DEVICE.

1,072,586.  Specification of Letters Patent.  Patented Sept. 9, 1913.

Application filed March 7, 1912. Serial No. 682,182.

*To all whom it may concern:*

Be it known that I, ROBERT W. L. DONLAN, a citizen of the United States, residing at Seattle, in the county of King and State of Washington, have invented certain new and useful Improvements in Vehicle Spring Devices, of which the following is a specification.

This invention relates to improvements in the spring supports for vehicle bodies; and the object of the invention is to provide devices of this character which, in addition to performing the usual function of vehicle springs, operate as shock-absorbers.

The various features of my invention will be illustrated and described in the accompanying drawings and specifications.

In the drawings, Figure 1 is a side elevation of my improved devices applied to a vehicle body. Fig. 2 is a like view of the same with the casing cover removed. Fig. 3 is a fragmentary view similar to Fig. 2 but with certain of its parts in different operative positions. Fig. 4 is a transverse vertical section through Fig. 1.

The reference numeral 5 designates the body of a vehicle, and to the underside of which is rigidly secured the casing of the improved spring supports therefor. In practice, there will be two such supports for each axle.

A casing comprises a substantially rectangular frame 6 having detachable side walls 7 and 7'.

6' represent apertured lugs formed upon the casing frame whereby the casing is secured to the vehicle body.

8 is an axle for the vehicle wheels and extends through a rectangular collar 9 disposed between the walls 7 and 7' of the casing, as shown in Fig. 4. Said collar in effect constitutes a part of the axle and may, if desired, be constructed integrally therewith.

Provided interiorly of the casing are saddle members consisting of a pair of arms 10 disposed in rectangular relation to afford a recess therebetween to receive the corners of the collar 9 and fit against the adjacent sides of the collar. Medially of the arms of the saddle member it is provided with an outwardly directed arm 11 terminating in a concave face 11'. Positioned against the respective faces 11' of these arms are cylindrical elements, or rollers 12 and about the latter extends an endless belt, 13, which may be a chain or a suitable flexible band. Said belt is maintained under tension by means of spring pressed rollers 14 acting against the exterior of the belt and intermediate the rollers 12. For each of the rollers 14 is provided a post 15 disposed radially, or approximately so, to the transverse axis of the casing. At the inner end of a post is an enlarged head 15' which is formed with a concave end in juxtaposition with a roller 14. As shown in Fig. 4, the posts 15 are socketed in bushings 16 extending through the frame. Said bushings are exteriorly screw threaded for engagement with threads formed in the apertures which are provided therefor in the frame. Screw threads are also provided within the bushings to engage screw plugs 17 at their outer ends. Interposed between each post and the associated plug 17 is a helical spring 18.

Centrally in the casing walls 7 and 7' is an opening 19 of sufficient size to permit of the movement of the axle with respect to the casing.

20 represent rectangular openings provided in the casing walls at diametrically opposite sides of the openings 19. The purpost of the openings 20 is to accommodate studs 21 which protrude from the opposite sides of the aforedescribed saddle members. The openings 20 are of greater sizes than the various studs, and are arranged to have the inner horizontal and vertical edges 20' and 20² engage the corresponding sides of the respective studs when the axle 8 is in the relative position in which it is represented in Figs. 1 and 2; that is to say, the referred to sides of the openings 20 will limit the centripetal movements of the saddle members even when the collar 9 is displaced from its central position. When the collar, however, is thus displaced it carries therewith the saddle members which may be in the direction of its travel.

The operation of the invention is as follows: When a casing which is rigid with a vehicle body descends, for example, with respect to the axle, the studs 21 which protrude from the lower saddle members through the corresponding openings 20 of the casing are carried with the latter by being pushed downwardly by the edges 20' of such openings. The studs of the upper saddle members, however, are uninfluenced by the casing and these saddle members are prevented from descending by being supported on the axle collar 9, as will be understood from an inspection of Fig. 3. Consequently, the lower saddle members are separated from the upper ones resulting in the belt being spread horizontally in opposition to the power of the springs 18 at the front and back which act through the medium of the posts 15 associated therewith. The springs 18 at the bottom and top also resist the ensuing downward travel of the moving saddle members and consequently all of the springs serve to withstand any change in the position of the casing in relation to the axle and contribute to restore the various parts to the normal positions in which they are represented in Fig. 2.

The office of the belt 13 is to distribute the strains among the various springs and in the accomplishment of which there will be more or less shifting movement imparted to the belt which is compensated for by the rollers 12 and 14. The springs are regulated by adjusting the bushings 16 or, if desired, the regulation may be performed through the instrumentality of the plugs 17, although the latter are primarily intended to afford removable closures for the bushing ends for introducing or removing the springs.

What I claim, is—

1. The combination of an axle, a casing, saddle members engageable with the axle and the casing, a belt inclosing the saddle members, and spring pressed devices connected to the casing and serving to cause the belt to become operative with respect to said saddle members.

2. The combination of the casing, an axle extending therethrough, a collar provided on the axle within said casing, a plurality of saddle members, a stud on each of the saddle members, means provided in the casing for engaging said studs, a belt surrounding said members, a plurality of posts supported by the casing, springs tending to push said posts against the belt, and means for regulating the springs, substantially as described.

3. The combination of the casing, an axle extending therethrough, a collar provided on the axle within said casing, a plurality of saddle members, a stud on each of the saddle members, means provided in the casing for engaging said studs, a belt surrounding said members, rollers interposed between the belt and the respective members, a plurality of posts supported by the casing, springs tending to push said posts against the belt, rollers interposed between the belt and the respective posts, and means for regulating the springs, substantially as described.

4. In appliances of the class described, an axle provided with a collar, saddle members, a belt inclosing the saddle members, and spring pressed devices positioned at opposite sides of the axle and acting against the belt for yieldingly holding said saddle members against said collar.

5. In appliances of the class described, an axle provided with a collar, saddle members, a belt inclosing the saddle members, spring pressed devices positioned at opposite sides of the axle and acting against the belt for yieldingly holding said saddle members against said collar, and means for adjusting said devices.

6. A spring support for a vehicle body comprising in combination with a casing secured to the vehicle body and an axle, a plurality of saddle members, a belt surrounding said members, a plurality of spring pressed devices acting to yieldingly retain said members in engaged position with respect to the axle, and means provided upon the respective members and coöperating with devices provided in said casing whereby said members are moved asunder when the relative positions of the body and the axle are varied in opposition to said springs and through the medium of the belt.

7. A spring support for a vehicle body comprising in combination with a casing secured to the vehicle body and an axle, a plurality of saddle members, a roller for each of said members, a belt surrounding said members and engaging the rollers, a plurality of spring pressed devices acting to yieldingly retain said members in engaged position with respect to the axle, and means provided upon the respective members and coöperating with devices provided in the casing whereby said members are moved asunder when the relative positions of the body and the axle are varied in opposition to said springs and through the medium of the belt.

8. In apparatus of the class described, an axle, a plurality of springs arranged radially to the axle when the latter is in its normal position, and a belt influenced by all of said springs whereby the axle is yieldingly retained against movements in all directions radially of the axle.

9. In apparatus of the class described, an axle, a casing, an endless belt surrounding the axle and operatively connected therewith, and springs connected to the casing and acting through the medium of said belt to resiliently retain the axle in an adjustable position relatively to the casing.

Signed at Victoria, B. C., Canada, this 28th day of February, 1912.

ROBERT W. L. DONLAN.

Witnesses:
 FRANK J. BROWN,
 WM. WILKIE.

Copies of this patent may be obtained for five cents each, by addressing the "Commissioner of Patents, Washington, D. C."